(12) United States Patent
Dilanchian

(10) Patent No.: US 9,079,262 B2
(45) Date of Patent: Jul. 14, 2015

(54) THREAD REPAIR SYSTEM

(76) Inventor: Hamlet Dilanchian, Glendale, CA (US)

( * ) Notice: Subject to any disclaimer, the term of this patent is extended or adjusted under 35 U.S.C. 154(b) by 661 days.

(21) Appl. No.: 13/404,919

(22) Filed: Feb. 24, 2012

(65) Prior Publication Data

US 2013/0223944 A1 Aug. 29, 2013

(51) Int. Cl.
*B23G 5/08* (2006.01)
*B23G 9/00* (2006.01)

(52) U.S. Cl.
CPC .............. *B23G 9/009* (2013.01); *Y10T 408/03* (2015.01); *Y10T 408/8588* (2015.01); *Y10T 408/85895* (2015.01); *Y10T 408/892* (2015.01); *Y10T 408/8928* (2015.01); *Y10T 408/9048* (2015.01)

(58) Field of Classification Search
CPC ........ B23G 5/08; B23G 5/14; B23G 2200/08; B23G 2240/056
USPC ......... 408/80, 81, 82, 83, 153, 157, 161, 168, 408/169, 170, 171, 173, 78, 222, 215; 470/201, 202, 203
See application file for complete search history.

(56) References Cited

U.S. PATENT DOCUMENTS

| | | | |
|---|---|---|---|
| 79,276 A * | 6/1868 | Sullivan | ........................ 408/169 |
| 188,466 A | 3/1877 | Johnsof | |
| 637,718 A | 11/1899 | Duncan | |
| 876,964 A | 1/1908 | Holmes et al. | |
| 1,075,753 A | 10/1913 | Bastian | |
| 1,217,833 A | 2/1917 | Washington | |
| 1,509,438 A | 9/1924 | Miller | |
| 1,890,052 A | 12/1932 | German | |
| 2,284,768 A | 6/1942 | Ramsdell | |
| 2,949,618 A | 8/1960 | Peyser et al. | |
| 4,090,808 A | 5/1978 | Nannen et al. | |
| 4,661,028 A | 4/1987 | Sanger | |
| 5,281,059 A | 1/1994 | Stuckle | |
| 5,718,636 A | 2/1998 | Meyn et al. | |
| 5,803,676 A | 9/1998 | Wienss | |
| 6,544,127 B1 * | 4/2003 | Abraham et al. | ............. 470/198 |
| 6,565,297 B2 | 5/2003 | Schmitt | |

OTHER PUBLICATIONS http://www.gardspecialists.com, Cutting Tools Portion.

* cited by examiner

*Primary Examiner* — Sunil K Singh
*Assistant Examiner* — Alan Snyder
(74) *Attorney, Agent, or Firm* — Jeffrey G. Sheldon; Leech Tishman; Fuscaldo & Lampl

(57) ABSTRACT

A thread repair tool comprises a support, a removable cutter, and a clamp for holding the cutter in position. The support can be provided with a leg supporting the cutter. The inner surface of the leg and the inner surface of the cutter can be tapered so that moving the cutter away from the head of the support can change the cutting diameter.

18 Claims, 5 Drawing Sheets

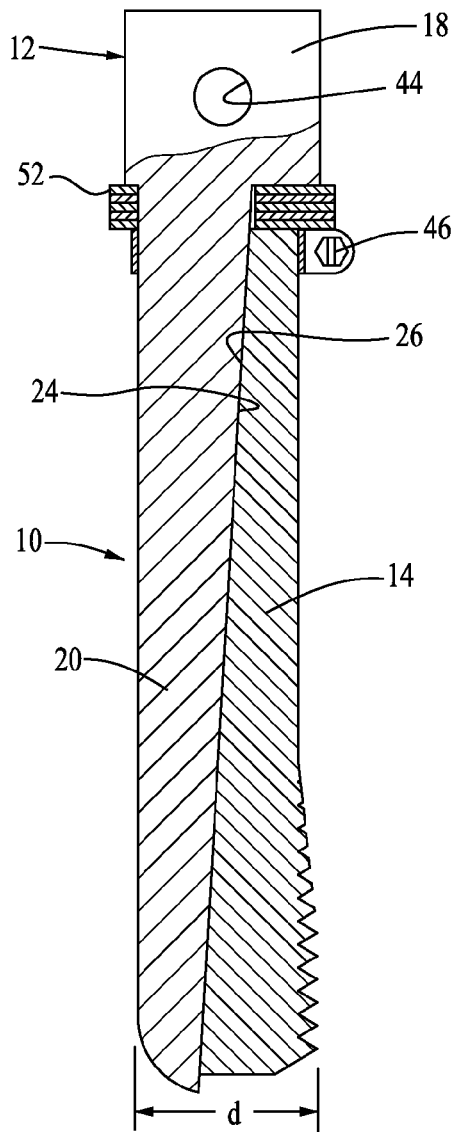
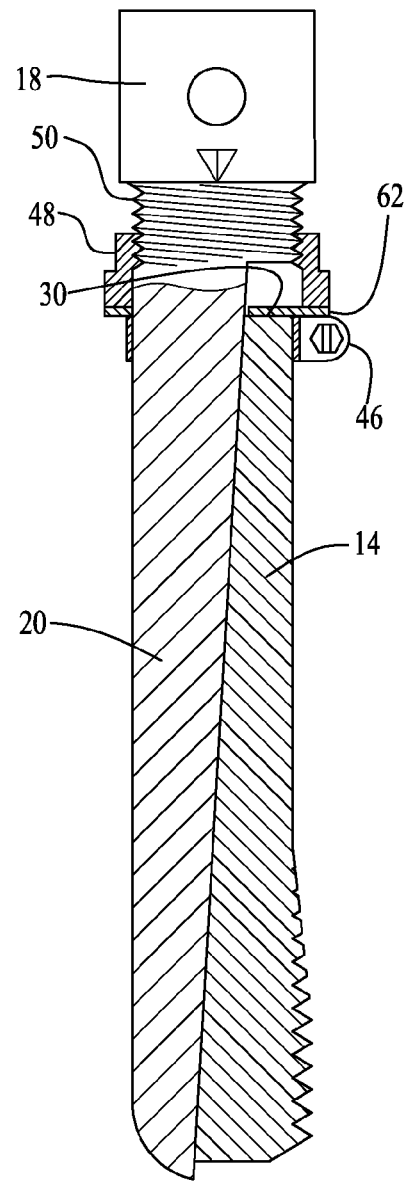
fig.2
fig.3
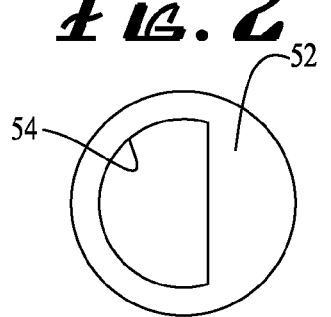
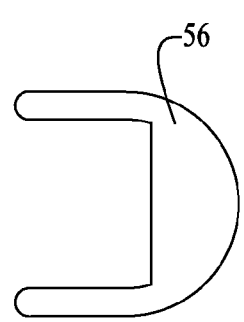
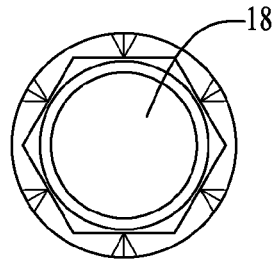
fig.2A  fig.2B  fig.3A

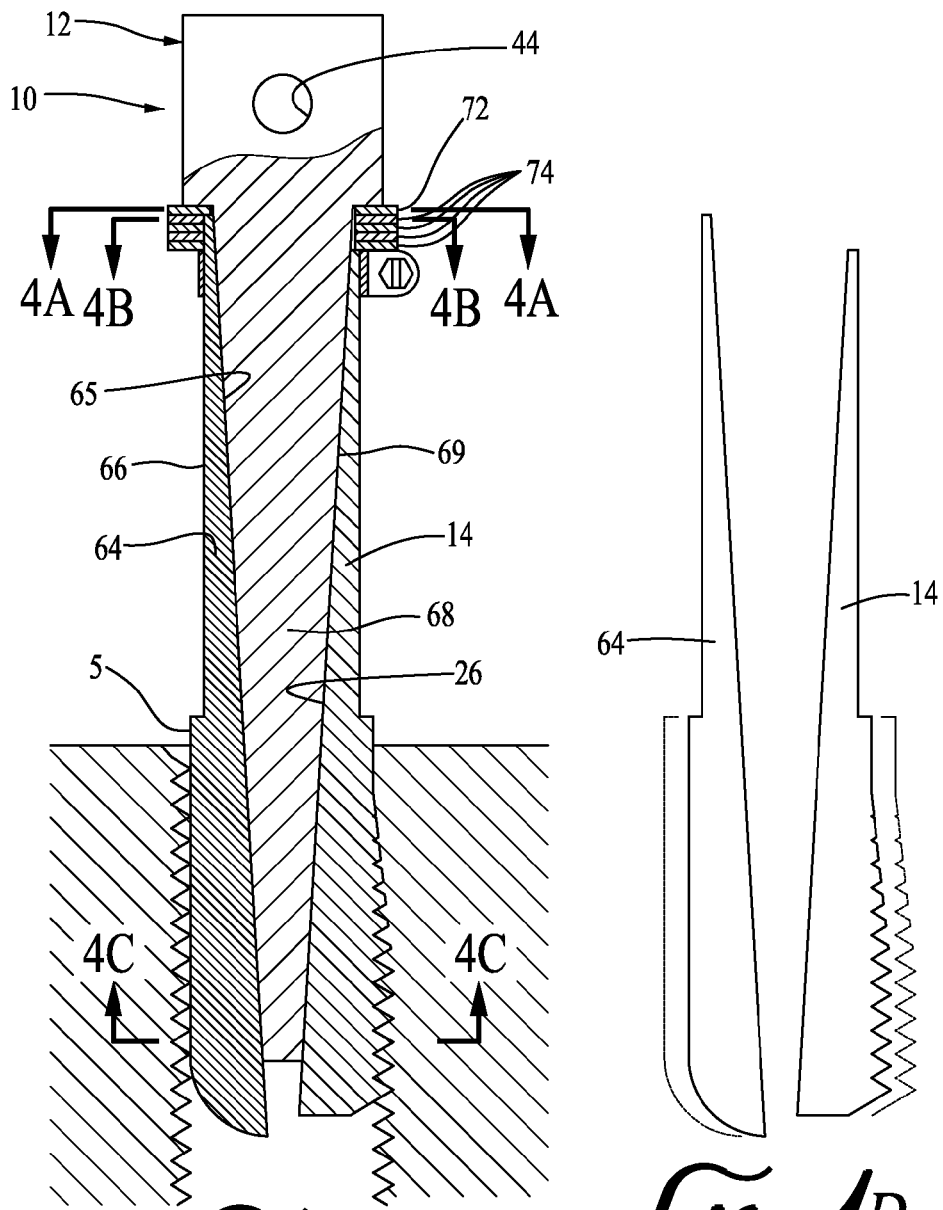

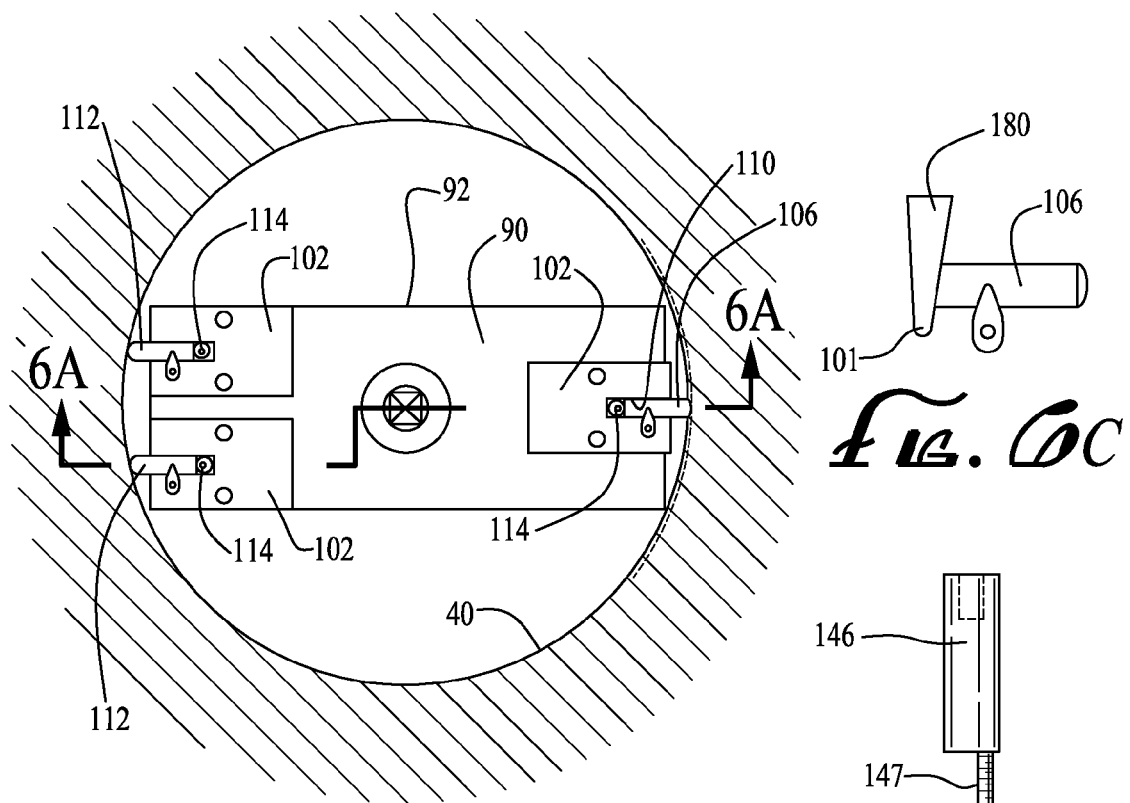
FIG. 6  FIG. 6C
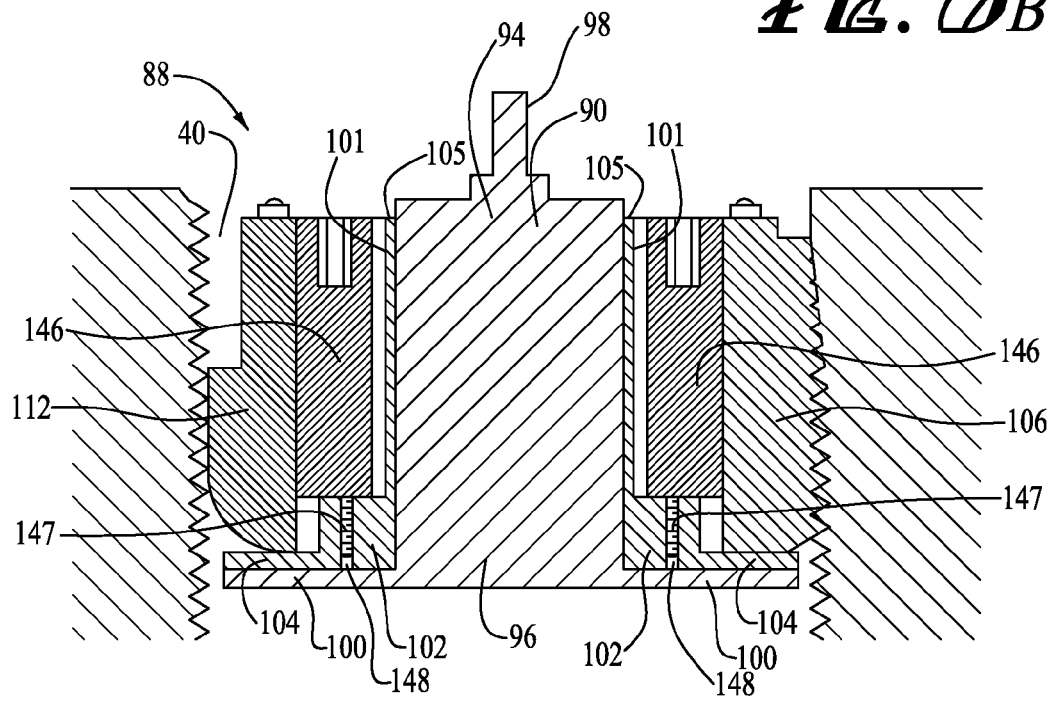
FIG. 6B
FIG. 6A

THREAD REPAIR SYSTEM

BACKGROUND

Threaded holes are common in machinery and mechanical apparatus, such as spark plug holes in an engine block, plumbing holes and tank holes, stud holes, and the like. The threads can become damaged during use, and if this occurs, repairs are often difficult or impossible. Bolts and other fasteners cannot be securely threaded into hoes with damaged threads, which can result in scrapping of expensive machinery.

A variety of techniques are known for creating threads in a hole or repairing damaged threads, such as those described in U.S. Pat. Nos. 4,090,808; 0,637,718; 0,188,466; 5,718,636; 4,661,028; 5,281,059; 1,217,833; 1,890,052; 6,565,297; 5,803,676; 2,949,618; 1,509,438; 0,876,964; 1,075,753 and 2,284,768. However, these techniques suffer from one or more of the following disadvantages, namely inapplicability to use in blind holes, inability to adjust to different sized holes, complexity, difficult to use, cost, and inability to repair threads in large sized holes.

Therefore there is a need for a thread repair system that overcomes the deficiencies of the prior art.

SUMMARY

A thread repair system that overcomes at least some disadvantages of prior art systems includes a tool comprising (i) a support, (ii) a removable cutter, and (iii) holding means. The support has a head and a leg depending from the head, the leg having an outer surface and an inner surface. The removable cutter has a top surface proximate to the head, an inner surface against the inner surface of the leg of the support, and an outer surface provided with cutting threads for tapping. The holding means, such as a bushing, a clamp, or a nut, holds the cutter against the leg. The head can be adapted for rotating the tool such as by a wrench.

In this first version of the invention, the outer surface of the cutter and the outer surface of the leg define a cutting diameter. Optimally, but preferably, the inner surface of the leg and the core inner surface are tapered so that movement of the cutter relative to the head alters the cutting diameter. Since this movement can result in a space between the head and the cutter, there can be at least one spacer spacing the cutter away from the head.

In a second version of the invention that allows for easy adjustment of the tool for different sized holes, the tool comprises a support having a head and a core depending from the head. At least one removable guide is proximate to the head, the guide having an outer surface and an inner surface against the core. There is also a removable cutter having a top surface proximate to the head, an inner surface against the core, and an outer surface provided with cutting threads for tapping. There is also a holding means for holding the cutter and guides against the core. The core, cutter, and guides can be tapered as in the first version with spacers provided for easily altering the cutting diameter.

In a third version of a thread repair tool, there is a support having an outer surface. A cutter has an inner surface proximate to the core outer surface and a cutting surface distal from the core outer surface. The tool includes means for adjusting the distance between the cutter and the core outer surface. There is at least one guide proximate to the core outer surface and means for adjusting the distance between the core outer surface and the guide. Typically the cutter and guide are at opposite sides of the core outer surface. There can be multiple guides, and one or more of the guides can also be provided with a cutting surface.

In a method of using the tools for repairing threads of a hole, the cutter can be moved relative to the head for adjusting the cutting diameter to an appropriate selected cutting diameter. The holding means is tightened for holding the cutter at the selected cutting diameter. Then after placing the tool in the hole, the tool is rotated for repairing the threads.

DRAWINGS

These and other features, aspects, and advantages of the invention will become better understood with reference to the following description, appended claims, and accompanying drawings where:

Figure 1:
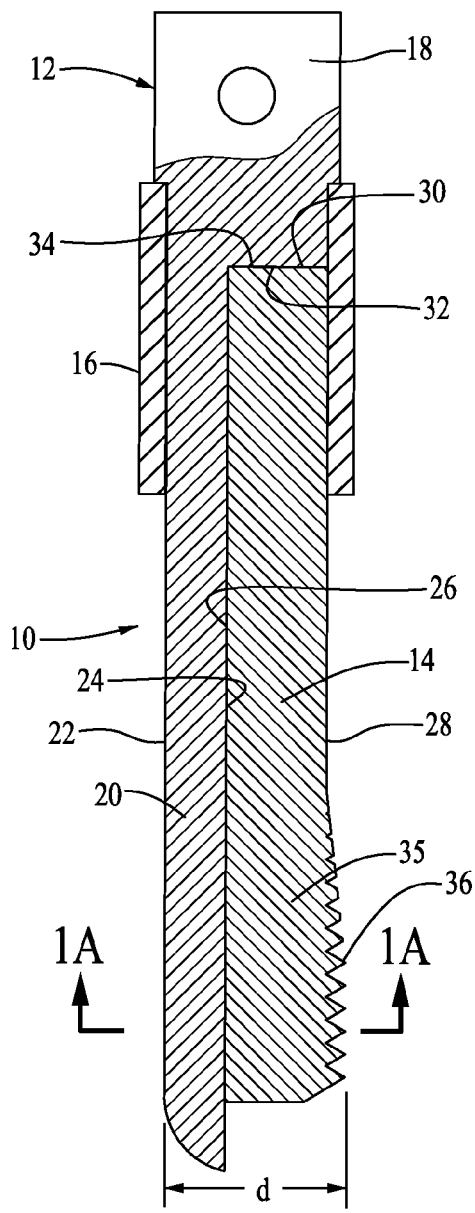
FIG. 1 is a front sectional view of a first thread repair tool having features of the present invention.
Figure 1A:
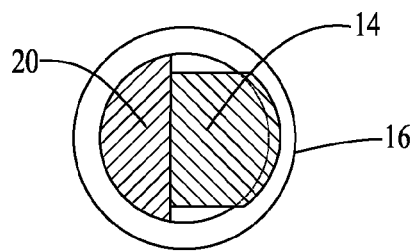
FIG. 1A is a sectional view of the tool of FIG. 1 taken on line 1A-1A in FIG. 1.
Figure 1B:
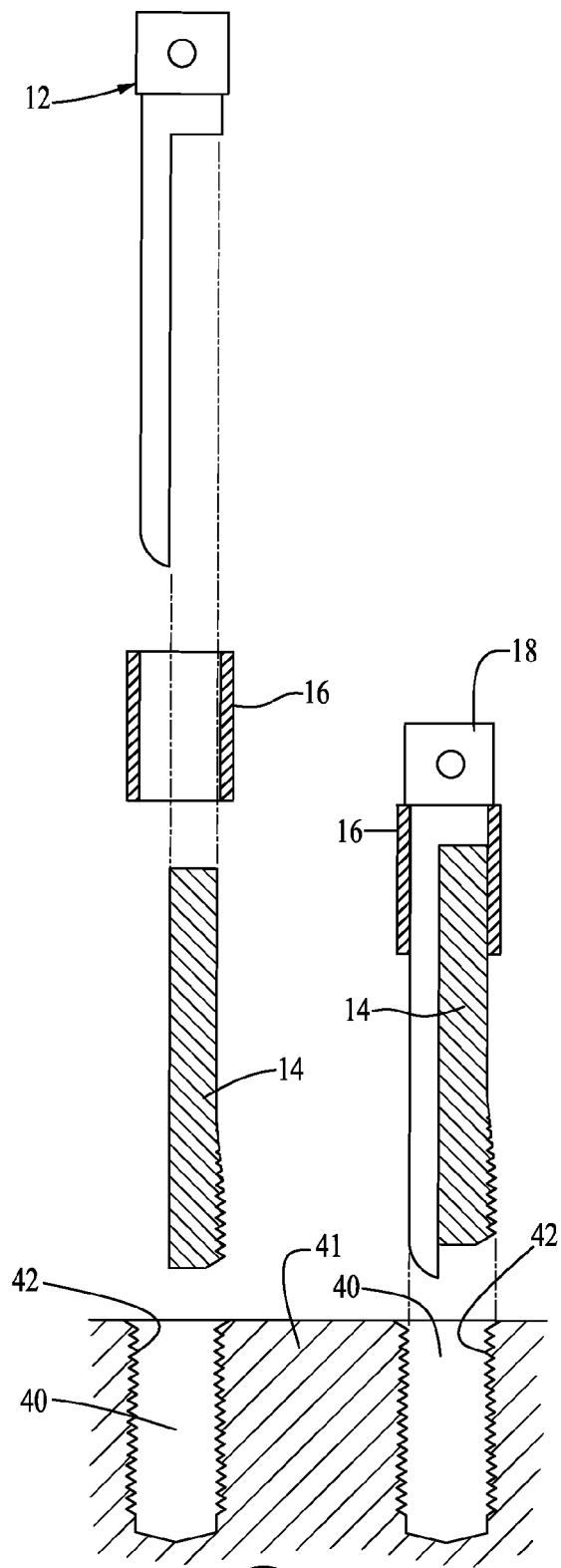
Figure 5:
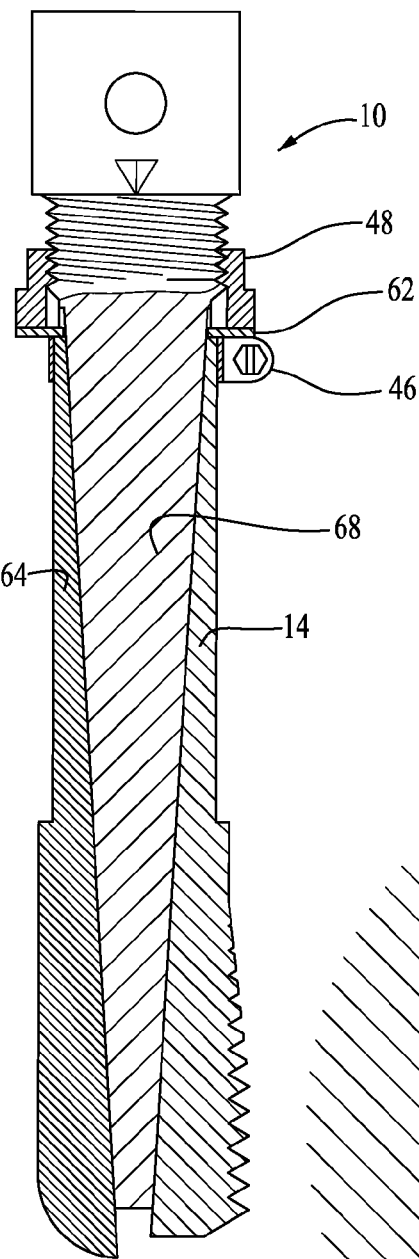
Figure 5A:
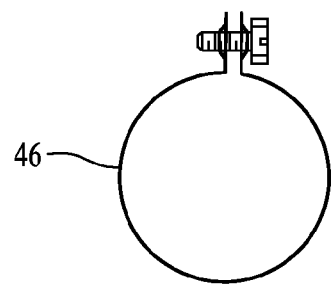
Figure 5B:
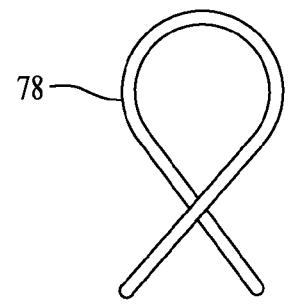
Figure 7:
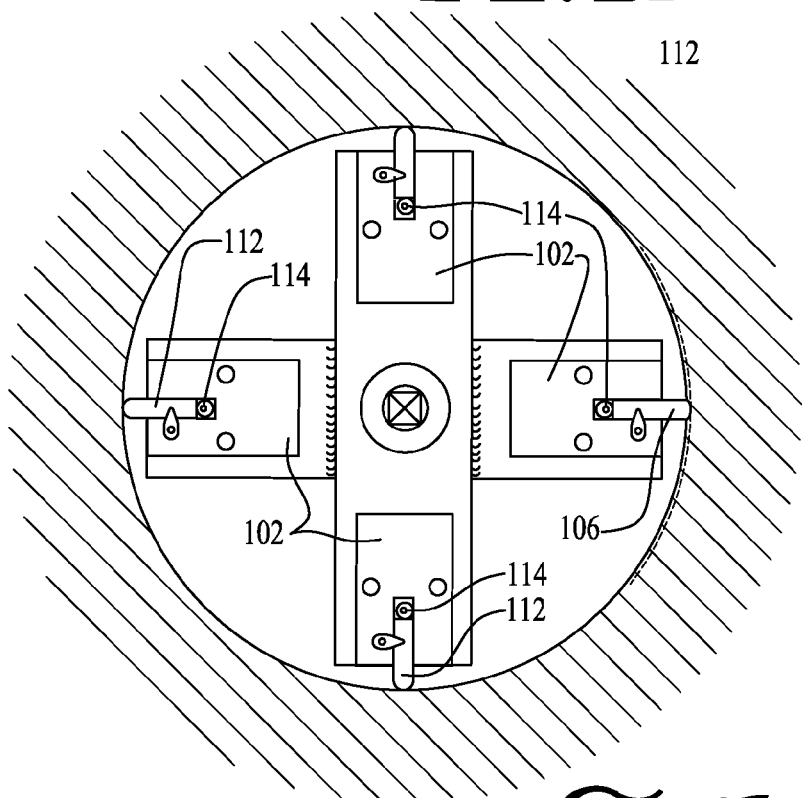

FIG. 1B, on the left side, is an exploded view, partly in section, of the tool of FIG. 1 and on the right side the tool of FIG. 1 assembled, and in both places the tool poised above a threaded hole where the threads require repair;

FIG. 2 is a sectional view of a second thread repair tool having features of the present invention;

FIGS. 2A and 2B are top plan views of first and second spacers, respectively, for use in the tool of FIG. 2;

FIG. 3 is a front partial sectional view of a third version of a thread repair tool having features of the present invention;

FIG. 3A is a top plan view of the tool of FIG. 3;

FIG. 4 is a front sectional view of a fourth version of a thread repair tool having features of the present invention;

FIGS. 4A, 4B and 4C are sectional views of the tool of FIG. 4 taken on lines 4A-4A, 4B-4B, and 4C-4C, respectively, in FIG. 4;

FIG. 4D is a schematic view of the tool of FIG. 4 showing the tool in a first position for cutting threads in a first hole, and in phantom showing the tool adapted for repairing threads in a second larger hole;

FIG. 5 is a front partial sectional view of a fifth version of a thread repair tool having features in the present invention;

FIG. 5A is a top plan view of a first clamp for use with the tool of FIG. 5;

FIG. 5B is a top plan view of a second clamp for use with the tool of FIG. 5;

FIG. 6 is a top plan view of a sixth version of a thread repair tool having features of the present invention;

FIG. 6A is a sectional view of the tool of FIG. 6 taken along line 6A-6A in FIG. 6;

FIG. 6B is a front elevation view of a clamp for clamping guides of the tool of FIG. 6;

FIG. 6C is a top plan view of a clamp for use with the tool of FIG. 6; and FIG. 7 is a top plan view of a seventh version of a tool having features of the present invention.

DESCRIPTION

With regard to FIGS. 1, 1A and 1B, a thread repair tool 10 comprises a support 12, a removable cutter 14, and a bushing 16. By "removable' there is meant that the cutter, or in the case of a leg or guide as described below, the part is not integral with the support. The support 12 has a head 18 and a leg 20 depending from the head 18. The leg 20 has an outer surface 22 and an inner surface 24. The cutter 14 likewise has an inner surface 26 and an outer surface 28, as well as a top surface 30.

A bottom surface 32 of the head in a region where the leg 20 is not located provides a ledge 34 against which the top surface 30 of the cutter 14 can be seated. The outer surface 28 of the cutter 14 in a cutting region 35 distal from the head 18 is provided with cutting threads, also known as teeth 36 for tapping and repairing damaged threads, particularly in a blind hole. The bushing 16 holds the leg 20 snugly in place against the ledge 32 and against the inner surface 24 of the leg 20.

In the version of the invention of FIG. 1, both the leg 20 and cutter 14 are elongated, with the leg 12 extending away from the head 18 farther than does the cutter 14. The cutting portion 35 of the cutter 14 is slightly tapered away from the leg, thereby providing an increased diameter to provide a cutting diameter "d" as shown in FIGS. 1 and 1A.

The tool is adapted for placement in a hole 40 (see FIG. 1B) having a wall 41 with damaged threads 42.

The head 18 is adapted for rotating the tool 10 in the hole 40, such as having a configuration easily turned by a wrench, or having a rotation hole 44 therethrough for engagement by a turning rod (not shown) or even an appropriately sized screw driver.

Other holding means for holding the cutter 14 against the leg 20 can be provided rather than the bushing 16, such as (i) a clamp 46 to be tightened with a screw driver, such as a radiator hose style clamp (see FIGS. 2 and 5A); or (ii) a spring type claim 47 as shown in FIG. 5B, easily releasable by finger pressure. It does not need to be a tight clamp fit. The holder merely needs to hold the cutter and leg together.

An advantage of the tool of FIG. 1 is that merely by replacing the cutter 14, different configurations of threads can be accommodated. For example a cutter 14 for ¼-20 threads can be replaced with a cutter 14 for ¼-24 thread.

FIGS. 2 and 3 show another version of the invention wherein adjustment for different thread locations can be accommodated merely by moving the cutter 14 relative to the leg 20 after release of the holder such as the clamp 46. In particular, the inner surface 24 of the leg 20 is tapered so that the leg is smaller distal from the head than it is proximate to the head, and the inner surface 26 of the cutter 14 is complimentarily tapered so that it is larger distal from the head 18 than it is proximal to the head. This tapering can be reversed with the leg smaller proximate to the head than it is distal from the head, and the inner surface of the cutter smaller distal from the head than it is proximal to the head. The two inner surfaces 24, 26 preferably abut against each other without any element in between. Relative movement of the cutter 14 away from the head 18 along the leg 20 results in a decrease in the cutting diameter d. The reverse is true, i.e., sliding the cutter 14 towards the head 18 increases the cutting diameter.

So that the cutter is held securely in place, any gap resulting in movement of the cutter 14 away from the head preferably is filled in with one or more spacers 52 of the type shown in FIG. 2A. The spacer 52 has a cut out portion 54 through which the leg 20 extends. Alternately one or more spacers 56, as shown in FIG. 2B, which is generally U-shaped, can be used.

In an alternate version of the invention, as shown in FIG. 3, the support 12 adjacent to and below the head 18 is threaded with the threads 50 engaged by an adjustment nut 48 having a portion of the nut 48 distal from the head 18 engaging a plate 62 against which the top surface 30 of the cutter 14 is seated. Rotation of the nut 48 thereby results in movement of the cutter 14 relative to the head 18, thereby changing the cutting diameter d.

With reference to FIG. 4, there is shown another version of the invention similar in operation to that of FIG. 2, except with the addition of at least one guide 64 having an outer surface 5, the guide 64 providing additional versatility. In particular, the support 12, instead of having an offset leg 20, has a core 68, which alternatively can be referred to as a leg. The core 68 has an outer surface 69. In addition to the cutter 14, there is at least one such guide 64, and in the version shown in FIG. 4, three removable guides 64 equally spaced around the periphery of the core 64, as shown in FIG. 4C. An inner surface 65 of each guide 64 is proximate to the outer surface 69 of the core 68, and preferably abuts the outer surface 69 of the core 68. Thus with reference to FIG. 4C, there is a guide 64 at twelve o'clock, six o'clock, and nine o'clock, with the cutter 14 located at three o'clock. By the use of the guides 64, the tool of FIG. 4 securely engages the hole 40 for repairing threads.

The inner surface 26 of the cutter 14 is proximate to, and preferably abuts the core outer surface 69. The same type of tapering as used in the tool of FIG. 4 as described above, namely can be used with this version of the invention. In particular the core 68 is tapered to be narrower at its end distal from the head 18, while the guide 64 and cutter 14 are tapered to be larger in the region distal from the head 18. Accordingly, movement of the cutter 14 and guides 64 relative to the head 18 results in a change in cutting diameter. An advantage of having the multiple guides 64 is that improved engagement with the walls of a hole and improved cutting can be achieved.

Two different types of spacers can be used with the tool of FIG. 4 for filling any gap between the cutter 14 and the guides 64 relative to the head. With reference to FIG. 4A, there can be one or more spacers 72 and one or more spacers 74 as shown in FIG. 4B. The spacers 72 of FIG. 4A are generally annular in configuration with inwardly projecting projections 76, one projection for each of the cutter 14 and each of the guides 64 for securely holding them in position. Because the spacer 72 has a projection 76 for each guide 64 and the cutter 14, it can be used for spacing the guides and cutter away from the head. The spacer 74 of FIG. 4B has only one such projection 76, and is used just for spacing the cutter 14 away from the head 18. The tool 10 of FIG. 4 is shown in solid lines in a first configuration for use for cutting threads to a first depth and in phantom in a second configuration for cutting deeper threads. The change in position is exaggerated for demonstrative purposes. Removal of spacers 72 and 74 results in the second configuration.

The tool shown in FIG. 5 is similar to the tool of FIG. 4, except uses a nut, such as shown in FIG. 3, for adjusting the position of the guides 64 and cutter 14.

In all versions of the invention shown in FIGS. 1-5, the cutter is easily removed and replaced, as well as any guides present, for different thread depths and spacing.

FIG. 6 shows a tool 88 that is particularly adapted for large sized holes 40. In particular, the tool 88 comprises a central support 90 having an outer wall 92, an upper portion 94, a lower portion 96, a tool engaging projection 98 extending from the upper portion 94 for engagement by a device (not shown) for turning the cutting tool 88, and a foot 100 extending from the lower portion 96. Seated on the foot 100 and located inside a recess 101 of the support 90 is a locking block 102, which likewise has a bottom projecting foot 104 and has a top surface 105. A cutter 106 is seated on the foot 104 for engagement of threads 108 needing repair. The cutter 106 fits into a slot 110 in the locking block 102. With reference to FIG. 6, the cutter 106 is at a three o'clock position. At about the nine o'clock position, there are two more locking blocks 102, each of which supports a guide 112. Although the tool shown in FIGS. 6 and 6A has two such guides 112, it is possible to have only one guide 112, or as shown in FIG. 7, multiple guides 112. In the version of the invention shown in FIG. 7, there is a cutter 106 at the three o'clock position, and three guides 112 equally spaced around the periphery of the central support 90 at the twelve o'clock, six o'clock, and nine o'clock positions.

The guides 112 and cutter 106 are held in position by swivel locks 114 mounted on the top surface 105 of the locking block 102

Different sized holes are accommodated by use of means for adjusting the distance between the support 90 and the cutter 106 and the guides 112. In the version of the invention shown in FIGS. 6 and 6A, the locking means can be a block 146 interposed between the locking block 102 and the cutter or guide, the block 146 having a depending leg 147 fitting into an elongated hole 148 in the locking block 102. The block 146 can have an opening 147 in a top surface thereof engageable by a turning tool such as an allen wrench, for pivoting it. The leg 147 is off center, so that pivoting the block 146 varies the distance between the support 90 and the guide or cutting blades.

Optional adjusting means is shown in FIG. 6C which comprises a wedge 180 where moving it upwardly or downwardly varies the distance between the support an between the guide and/or cutting blade. As shown in FIG. 6C, the wedge 180 is shaped so it tapers to be narrower towards the foot 100, so movement of the wedge 180 toward the foot 101 increases the distance between the cutter 100 and the support wall, thereby allowing repair of threads of larger sized holes.

Although the present invention has been described in considerable detail with reference to certain preferred versions thereof, other versions are possible. For example, one or more of the guides 112 in FIG. 7 can be replaced with a cutter 106. Therefore, the spirit and scope of the appended claims should not be limited to the description of the preferred versions contained herein.

What is claimed is:

1. A thread repair tool comprising:
   a) a support comprising a head and a leg depending from the head, the leg having an outer surface and an inner surface;
   b) a removable cutter having a top surface proximate to the head, an inner surface against the inner surface of the leg, and an outer surface provided with cutting threads for tapping; and
   c) a holder holding the cutter against the leg, wherein the outer surface of the leg and the outer surface of the cutter define a cutting diameter.

2. The tool of claim 1 wherein the holder comprises a bushing.

3. The tool of claim 1 wherein the holder comprises a clamp.

4. The tool of claim 1 wherein a portion of the support is threaded for engagement with an adjustment nut.

5. The tool of claim 1 comprising at least one spacer between the top surface of the cutter and the head.

6. The tool of claim 1 wherein the head is adapted for rotating the tool.

7. A thread repair tool comprising:
   a) a support comprising a head and a leg depending from the head, the leg having an outer surface and an inner surface;
   b) a removable cutter having a top surface proximate to the head, an inner surface against the inner surface of the leg, and an outer surface provided with cutting threads for tapping; and
   c) a holder holding the cutter against the leg, wherein the outer surface of the leg and the outer surface of the cutter define a cutting diameter and both inner surfaces are tapered so that moving the cutter away from the head decreases the cutting diameter.

8. The tool of claim 7 comprising at least one spacer between the top surface of the cutter and the head.

9. The tool of claim 7 comprising a rotatable nut causing movement of the cutter relative to the head.

10. A method for repairing threads of hole comprising the steps of:
    a) selecting the tool of claim 7;
    b) moving the cutter relative to the head for adjusting the cutting diameter to a selected cutting diameter;
    c) tightening the holder for holding the cutter at the selected cutting diameter; and
    d) after step (c), rotating the tool in the hole for repairing the threads.

11. A thread repair tool comprising:
    a) a support comprising a head and a leg depending from the head, the leg having an outer surface and an inner surface;
    b) a removable cutter having a top surface proximate to the head, an inner surface against the inner surface of the leg, and an outer surface provided with cutting threads for tapping; and
    c) a holder holding the cutter against the leg, wherein the outer surface of the leg and the outer surface of the cutter define a cutting diameter, and both inner surfaces are tapered so that movement of the cutter relative to the head changes the cutting diameter.

12. A thread repair tool comprising:
    a) a support having a head and a core depending from the head, the core having an outer surface;
    b) at least one removable guide proximate to the head, the guide having an outer surface and an inner surface against the core;
    c) a removable cutter having a top surface proximate to the head, an inner surface against the core, and an outer surface provided with cutting threads for tapping; and
    d) a holder holding the cutter and the guide against the core, wherein the outer surface of the leg and the outer surface of the cutter define a cutting diameter.

13. The tool of claim 12 comprising at least two removable guides proximate to the head, both legs having an outer surface and an inner surface against the core.

14. The tool of claim 12 wherein the outer surface of the cutter and the outer surface of the guide define a cutting diameter, and both inner surfaces and the core outer surface are tapered so that movement of the cutter and guide relative to the head alters the cutting diameter.

15. The tool of claim 14 comprising at least one spacer spacing the cutter away from the head.

16. The tool of claim 15 wherein the spacer also spaces the guide away from the head.

17. The tool of claim 12 wherein the guide has a cutting surface.

18. A method for repairing threads of hole comprising the steps of:
    a) selecting the tool of claim 12;
    b) moving the cutter relative to the head for adjusting the cutting diameter to a selected cutting diameter;
    c) tightening the holder for holding the cutter at the selected cutting diameter; and
    d) after step (c), rotating the tool in the hole for repairing the threads.

* * * * *